Figure 1:
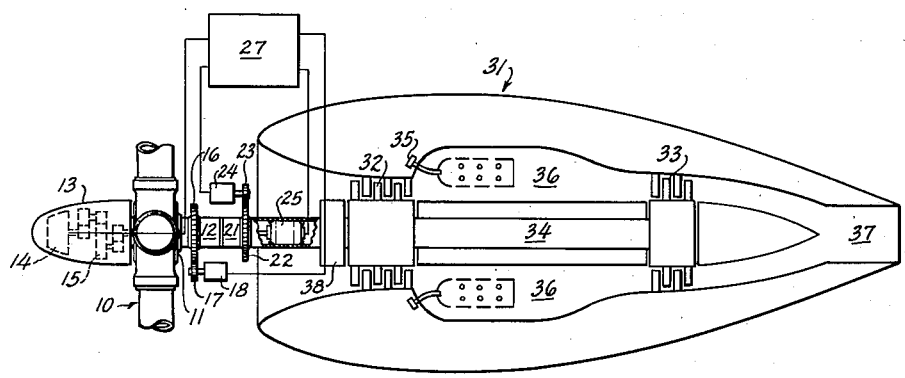

Oct. 16, 1951 O. W. EHLERS 2,571,848
APPARATUS FOR COUPLING AND UNCOUPLING PROPELLERS
Filed June 14, 1946 5 Sheets-Sheet 1

INVENTOR.
Otto William Ehlers
BY Walter J. Jason
ATTORNEY

Oct. 16, 1951  O. W. EHLERS  2,571,848
APPARATUS FOR COUPLING AND UNCOUPLING PROPELLERS
Filed June 14, 1946  5 Sheets-Sheet 2
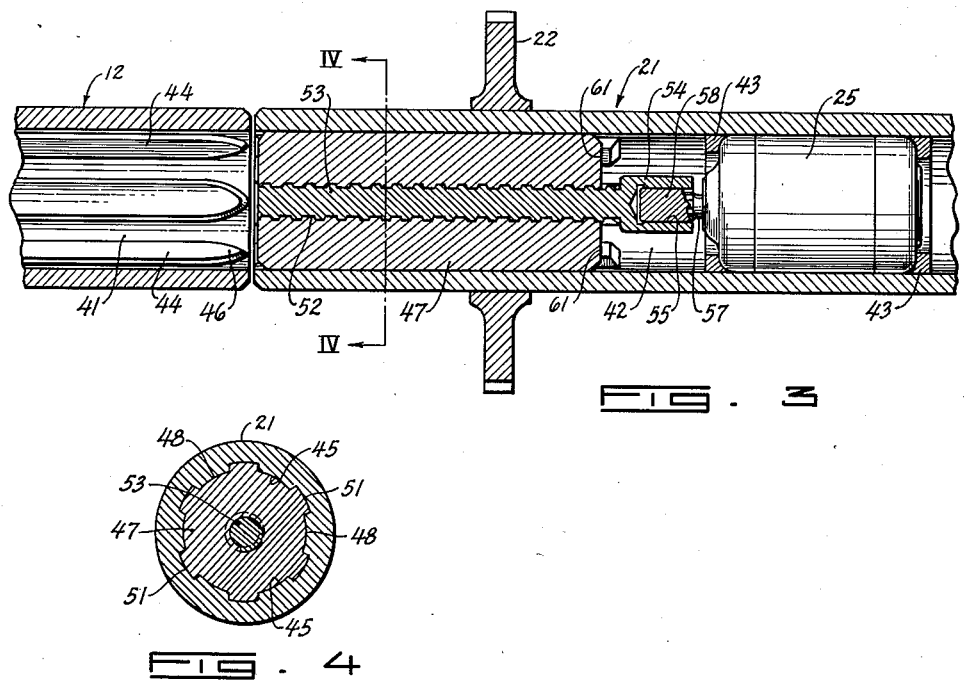
FIG. 3
FIG. 4
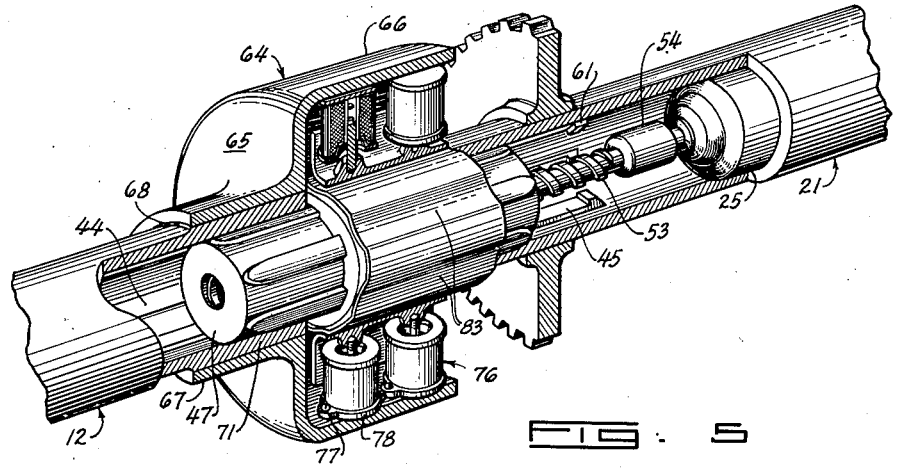
FIG. 5
INVENTOR.
Otto William Ehlers
BY
Walter J. Jason
ATTORNEY

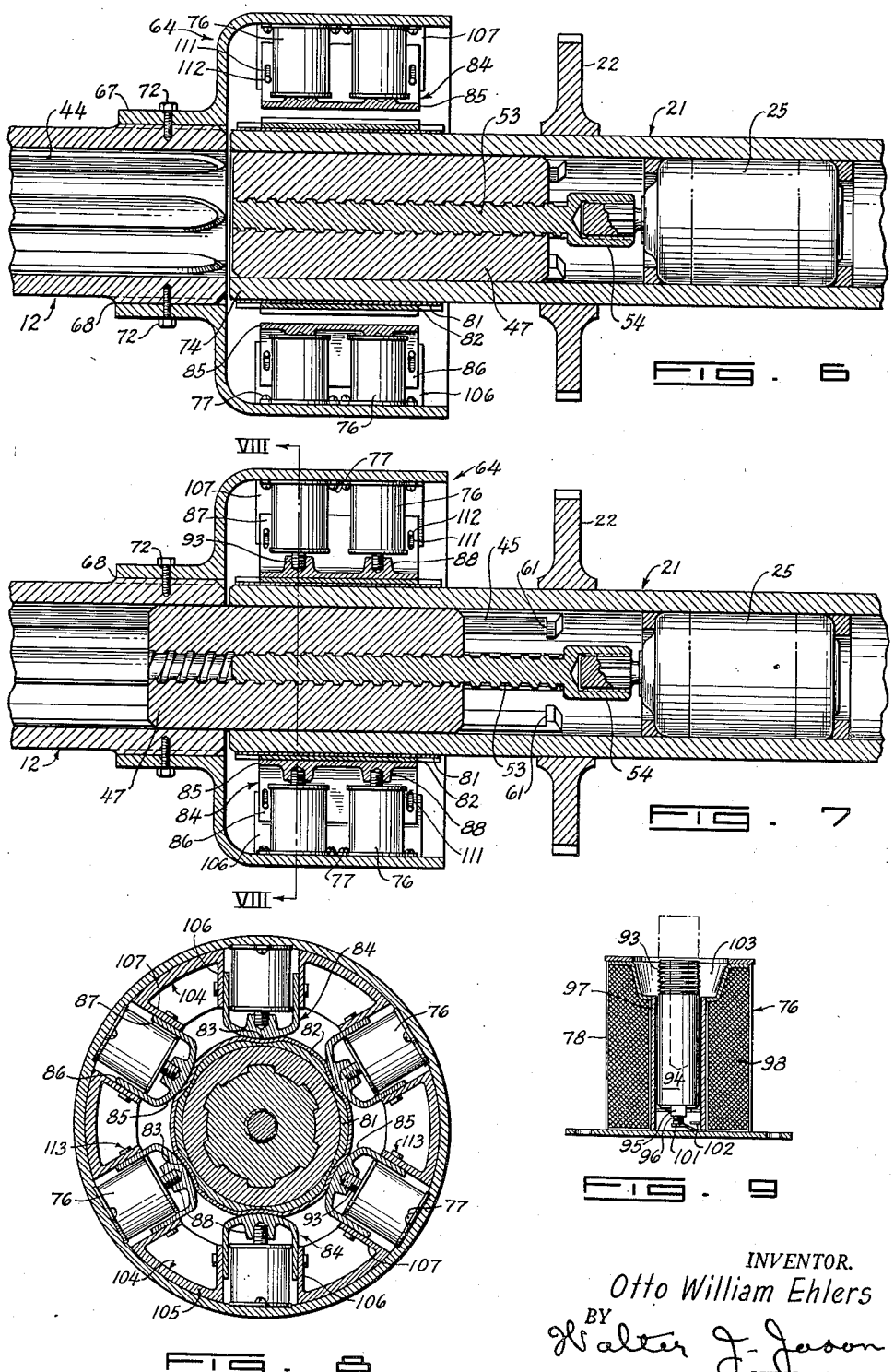

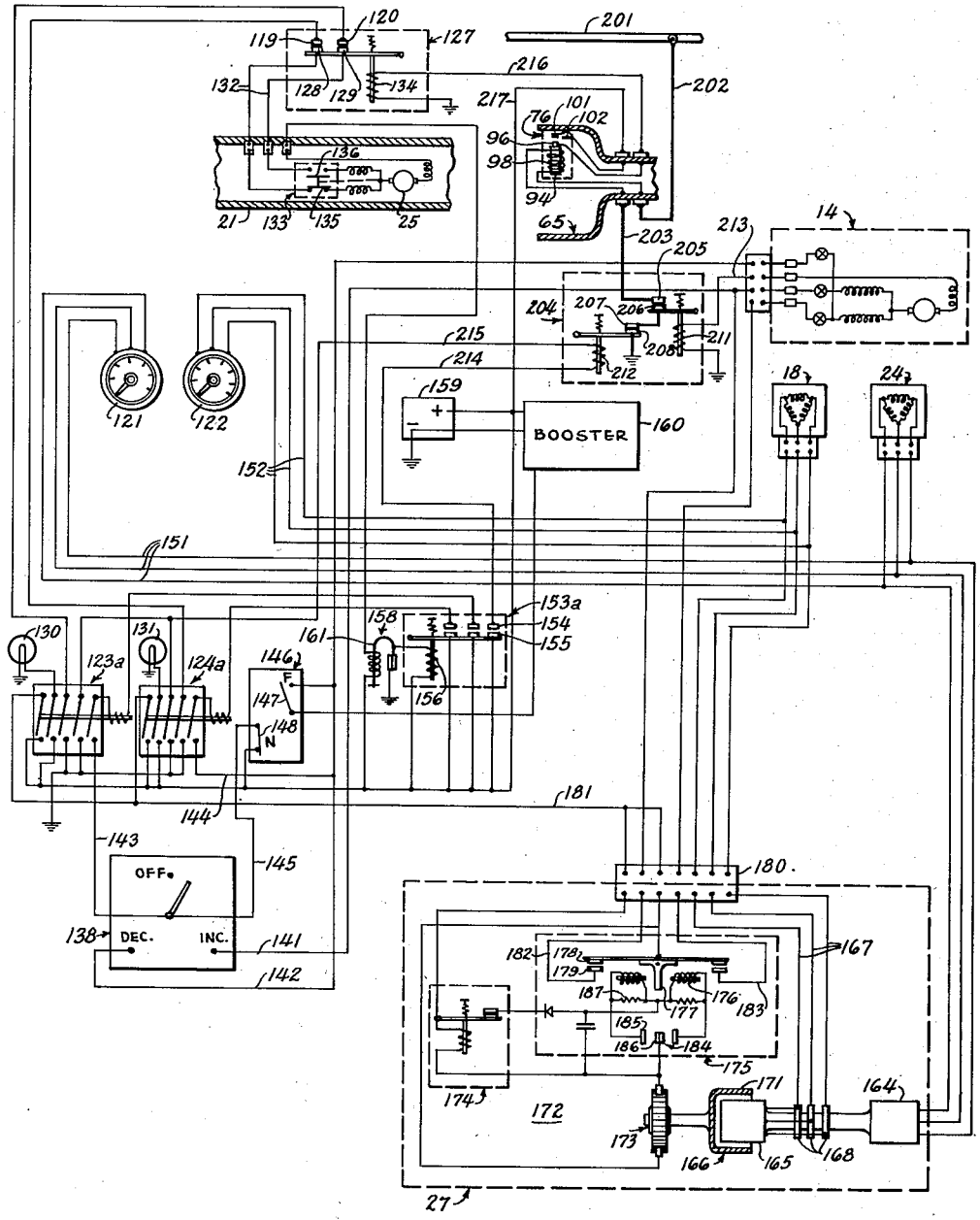

Patented Oct. 16, 1951

2,571,848

UNITED STATES PATENT OFFICE 2,571,848

APPARATUS FOR COUPLING AND UNCOUPLING PROPELLERS

Otto William Ehlers, Hermosa Beach, Calif., assignor to Consolidated Vultee Aircraft Corporation, San Diego, Calif., a corporation of Delaware Application June 14, 1946, Serial No. 676,783

12 Claims. (Cl. 192—67)

This invention relates to improvements in airscrew propulsion devices and more particularly to the coupling system between the engine and the airscrew it drives.

The invention to be described herein is particularly adapted for use in gas-turbine engine-propeller combinations for aircraft. With this invention it will be feasible to utilize both the propeller and the gas-turbine engine and to use each to full advantage. The greater speed obtainable by the use of jet propulsion over the speed provided by propeller propulsion devices is obviously desirable. However the use of a propeller has many advantages. For instance, the take-off distance required by an airplane utilizing a propeller is very much less than that of an airplane employing jet-propulsion.

This becomes an important criterion in the case of heavy military craft and large transports, which, if they had to rely on jet propulsion alone, would require flying fields of much larger dimensions than are currently readily available. Furthermore, the propeller can cope with emergency conditions more readily than the jet propulsion unit. For instance, if the pilot should overshoot the field in landing and require, instantly, the maximum thrust obtainable from the engine to sharply lift the airplane, the propeller can provide the needed thrust whereas the jet propulsion engine would be inadequate.

Likewise at low speeds, as when the airplane is coming in for a landing, the jet propulsion engine is very inefficient as compared with a propeller-engine combination.

With the present invention it is possible to employ both the propeller and the jet propulsion engine and obtain the best flying characteristics of each. The jet propulsion engine will perform a dual role, it will drive a propeller when it is advantageous to do so, as in take-off, climb and landing, and will be uncoupled from the propeller for cruising. The coupling system disclosed herein adapts the propeller to be readily and efficiently coupled and uncoupled from the jet propulsion unit while the airplane is in flight.

It is therefore an object of the present invention to provide in an engine-propeller propulsion unit a novel system for effecting the coupling and uncoupling of the propeller to and from the engine.

Another object of the invention is to provide in an engine-propeller combination improved means to effect synchronism of the speeds of the propeller shaft and the engine drive shaft.

Another object of the invention is to provide in a turbine engine-propeller combination an improved coupling system whereby the turbine engine may be used in combination with the propeller, or used alone, to propel an airplane.

Another object of the invention is to provide in a propeller-engine combination for airplanes, improved means for actuating a movable coupler element in reverse direction to effect coupling or uncoupling of the propeller from the engine while the airplane is in flight.

Another object of the invention is to provide in a propeller-engine combination improved mechanism for effecting the synchronizing of the movement of the propeller shaft with that of the movement of the engine shaft and for moving a coupler element when synchronization is obtained to effect coupling or uncoupling of the propeller from the engine.

Another object of the invention is to provide in a propeller-engine combination an improved form of coupling system embodying a clutch device.

Another object of the invention is to provide in a propeller-gas turbine engine combination wherein the propeller drive shaft and the gas turbine engine drive shaft are provided with splines, an improved coupling system which utilizes mechanism for synchronizing the speeds of the two shafts and for positively aligning the splines of the gas engine drive shaft with the splines of the propeller drive shaft.

Another object of this invention is to provide a coupling system of the type referred to which is characterized by simplicity of design and efficiency of operation.

Figure 2:
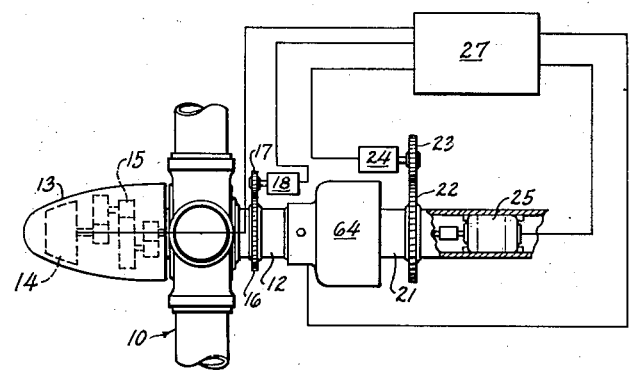
Figure 10:
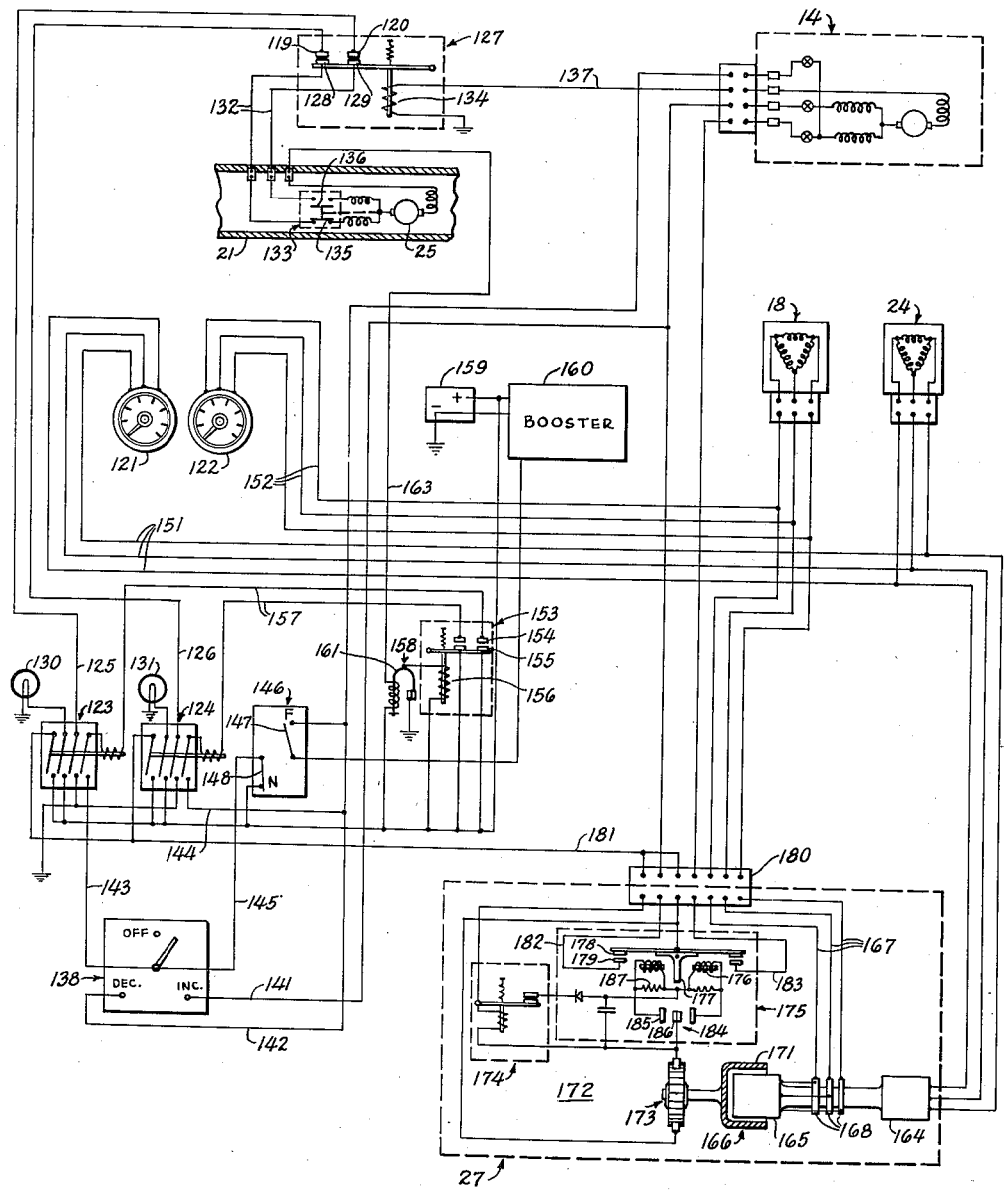

Other objects and features of this invention will be readily apparent to those skilled in the art from the following specification and appended drawings illustrating certain preferred embodiments in which:

Figure 1 is a schematic showing of one form of the invention, but with certain of the electrical devices employed by the invention and their electrical leads omitted for clarity of illustration, Figure 2 is a schematic showing of another embodiment of the invention, which is similar to that of Figure 1, but differing thereover in the use of clutch mechanism, Figure 3 is an illustration of the coupler elements of the embodiment of Figure 1 and in the position assumed by such elements when the propeller is uncoupled from the gas turbine engine, Figure 4 is a sectional view taken along the line IV—IV of Figure 3, Figure 5 is a perspective view of the coupler elements of the embodiment of Figure 2, Figure 6 is a longitudinal sectional view of the coupler elements of Figure 5 and showing the elements in uncoupled position, Figure 7 is similar to Figure 6 but with the coupler elements shown in coupled position wherein the propeller drive shaft is coupled to the gas turbine engine drive shaft, Figure 8 is a vertical sectional view taken along the line VIII—VIII of Figure 7, Figure 9 is a detail view showing a solenoid employed by the present invention, Figure 10 is a diagrammatic illustration of the first embodiment of the invention emphasizing the electrical circuit employed and omitting certain structure for clarity, and Figure 11 is a diagrammatic illustration of the second embodiment of the invention differing over Figure 10 in the inclusion of a clutch means and the manner of control thereof.

Referring to Figure 1, the system therein disclosed comprises a propeller 10 carried by a hub 11 which is mounted on a shaft 12. Disposed forwardly of the hub 11 is a spinner 13 which houses a propeller governor 14 and pitch control gearing 15. The details of the governor 14 and the gearing 15 are not shown because their exact construction forms no part of the present invention. They may be of any conventional design. The purpose of this governor mechanism within the spinner 13 is to provide a means for controlling the speed of the propeller 10 by regulating the pitch thereof. Changing the pitch of propeller 10 will affect the speed of an engine to which it is coupled in that the propeller can be made to absorb more or less power, thereby decreasing or increasing the engine speed to bring it to a predetermined value set on the governor. Located on the propeller shaft 12 rearwardly of hub 11 is a ring gear 16 which meshes with a ring gear 17 which effects the operation of an alternator 18. The alternator 18 is of a conventional design and is a three-phase alternating current generator which generates an alternating current voltage, the frequency of which will be directly proportional to the speed of the propeller shaft 12.

Aligned with the propeller drive shaft 12 is an engine drive shaft 21 which also carries a ring gear 22. The gear 22 meshes with a ring gear 23 which operates an alternator 24. The alternator 24 is similar to alternator 18 and also generates an alternating current voltage, the frequency of which will be directly proportional to the speed of the engine drive shaft 21. The engine drive shaft 21 is of hollow construction and houses a reversible constant speed electric motor 25 the purpose of which will be hereinafter described.

The propeller governor 14, the alternators 18 and 24, and the motor 25 are all electrically connected by means of suitable conductors to a synchronizing control unit 27, the operation and details of which will be later described.

A gas turbine engine 31 provides the motive power for turning the engine drive shaft 21 and thereby the propeller 10. The gas turbine engine 31 is of conventional design and comprises the usual compressor 32, turbine 33, with a shaft 34 interconnecting the compressor 32 and the turbine 33, a fuel injector 35, combustion chambers 36, a nozzle 37 and conventional reduction gearing 38 interconnecting the engine drive shaft 21 to the compressor whereby the engine drive shaft 21 is actuated. The exact construction of the gas turbine engine 31 forms no part of the present invention.

Figure 3 illustrates mechanism whereby coupling is obtained between the engine drive shaft 21 and the propeller drive shaft 12. As shown these drive shafts are respectively provided with bores 41 and 42 therethrough, the shafts being in alignment and the bores 41 and 42 being of equal diameter. The constant speed electric motor 25 is mounted within the bore 42 of engine drive shaft 21. It is rigidly held in place by brackets 43 which in turn are secured to the inner surface of the shaft 21, as by welding or in any other well known manner.

Formed in the passage 41 of drive shaft 12 are a plurality of annularly spaced longitudinally extending splines 44. Similarly in passage 42 of engine drive shaft 21 annularly spaced longitudinally extending splines 45 are provided and adapted to align with splines 44. The ends 46 of the splines 44 in the propeller drive shaft 12 are substantially pointed as shown for a purpose to be described.

Disposed in passage 41 of engine drive shaft 21 and rectilinearly movable therein is a substantially cylindrical coupling member 47. As seen in Figures 3 and 4 the outer periphery of the coupling member 47 is provided with a plurality of longitudinally extending grooves 48 to effect a plurality of annularly spaced splines 51. The grooves 48 are adapted to receive the splines 45 of the engine drive shaft 21. The ends of splines 51 disposed adjacent ends 46 of splines 44 are also pointed. The coupling member 47 has an internally threaded bore 52 extending therethrough. A worm drive element 53 is adapted to coact with the internally threaded bore 52. The worm drive element 53 is enlarged at one end to provide a substantially cylindrical portion 54 having a recess 55 therein with the interior surface of the recess being splined. From the motor 25 there extends a shaft 57 having an enlarged portion 58 which fits into the recess 55. The outer surface of the portion 58 is grooved to receive the splines in recess 55 and thereby provide an interconnection between the worm drive element 53 and motor 25 whereby the former may be rotated upon operation of the motor 25. The shaft portion 58 and the worm drive portion 54 are maintained in interconnection by a drive fit, although they could be maintained by the use of any other well-known fastening expedients, such as by set-screws, tapered pins or brazing. Rotation of the worm drive 53 will cause the coupler 47 to move along the trackways provided by splines 45 in bore 42, into the propeller drive shaft passage 41 wherein the splines 51 carried by coupler 47 mesh with the splines 44 in passage 41 and thereby couple the engine drive shaft 21 to the propeller drive shaft 12 for common movement. Reverse rotation of the worm drive 53 will move the coupler 47 in the reverse direction to effect uncoupling of the shafts 12 and 21. Having the ends 46 of splines 44 in passage 41 and the ends of splines 51 on coupler 47 pointed obviously permits the splines 51 to more readily enter passage 41 and mesh with splines 44. Shoulders 61 are provided on certain of the splines 45 of the engine drive shaft 21 to limit the rearward longitudinal movement of coupler 47. Similar shoulders (not shown) are provided on certain of splines 44 in passage 41 to limit the longitudinal movement therein of coupler 47.

The equipment for controlling the time of starting and stopping of motor 25 is shown in Figure 10 to be hereinafter described.

Figures 2 and 5 through 9 illustrate a second form of coupling system utilized by the present invention. This coupling system differs from the coupling system above described in the provision of a clutch means 64. As does the coupling system first described, this system, as shown in Figure 2, comprises a propeller governor unit 14 with its associated gearing 15 for controlling propeller 19; a hollow propeller drive shaft 12 having annularly spaced longitudinally extending splines 44; a hollow engine drive shaft 21 aligned with the shaft 12; alternators 18 and 24 associated with shafts 12 and 21; annularly spaced longitudinally extending splines 45 in engine drive shaft 21; an exteriorly splined coupling member 47 slidably movable in engine drive shaft 21 on the splines 45; a worm drive 53 for actuating the exteriorly splined coupler 47 into an out of propeller drive shaft 12, and a constant speed electric motor 25 connected to the worm drive 53 for rotation of the worm drive 53 in opposite directions.

The clutch means 64 includes a housing 65 having a generally cup-shaped portion 66 and a cylindrical portion 67 of smaller diameter extending from the base thereof and having an interiorly splined bore 68 extending therethrough whereby the cylindrical portion 67 is adapted to be fitted upon the exteriorly splined end 71 of the propeller drive shaft 12. The exteriorly splined end 71 of propeller shaft 12 cooperates with the interiorly splined bore 68 to key the cylindrical portion 67 of housing 65 in position. The housing 65 is rigidly secured to the propeller shaft 12 as by bolts 72. The cup-shaped portion 66 extends outwardly from the end 71 of the propeller drive shaft 12 and embraces a substantial portion of the forward end 74 of the engine drive shaft 21.

As shown in the drawings this clutch 64 comprises twelve solenoids 76 arranged in two sets of six, in side by side relationship, and annularly disposed and equally spaced about the engine drive shaft 21. It is to be understood that the invention is not limited to the number of solenoids shown; the number of solenoids used being dependent upon a variety of factors: The size of the propellers to be coupled and uncoupled, the weights of the mechanism employed, etc. The solenoids 76 are secured to the inner surface of the cup-shaped portion 66 by bolts 77 which pass through ears provided by enclosing casings 78 of the solenoids 76.

A bushing 81 is fitted upon the end 74 of the engine drive shaft 21 and is secured thereto as by rivets (not shown). The bushing 81 carries a bearing sleeve 82 which may be of brass or similar material. The bearing sleeve 82 is held in place by rivets (not shown) or in any other well known manner. The bearing sleeve 82 is provided with a series of spaced indentations 83 about its periphery as shown in Figure 8, there being as many indentations 83 as there are annularly arranged pairs of solenoids 76, in this instance six. The indentations 83 extend longitudinally and each are of sufficient length to receive a brake shoe 84. There are six brake shoes 84, one for each of the indentations 83, and each brake shoe 84 is carried by a pair of solenoids 76. The brake shoes 84 are each of a generally channel shape comprising an arcuate bearing portion 85 of a conformation similar to that of indentations 83 for ready seating therein; from the arcuate portion 85 extend spaced leg members 86 and 87. Depending from the inner surface of the arcuate portion 85 and between the parallel leg members 85 and 86 are a pair of longitudinally spaced bosses 88. The bosses 88 are provided with internally threaded recesses adapted to receive the externally threaded end 93 of a movable core member 94 of a solenoid 76. The solenoids 76 may be of the general construction shown in Figure 9. As illustrated, each solenoid 76 comprises a casing 78 housing the core element 94, one end 93 of which is threaded, as stated above, and the other end of which carries an extension 95 having a contact 96 secured thereto. A sleeve member 97 is disposed about the core member 94. A washer disposed in the sleeve 97 accepts the extension 95 and limits the inward travel of the core element 94 into the casing 78. Coil means 98 are provided within casing 78 and about the sleeve 97 for actuation of the core element 94 upon energization thereof. Located adjacent the inner end of core element 94 is a spring biased contact 101 adapted to cooperate with the contact 96; movement of the core 94 effects engagement and disengagement of contacts 96 and 101 to make and break an electrical circuit for a purpose to be hereinafter explained. A stop 102 limits the travel of the spring-biased contact 101 in the direction of its engagement with contact 96 so that the latter contact 96 can definitely disengage therefrom when so desired. As shown the upper end of the solenoid casing 78 has a recess 103 provided to accept the boss carried by brake shoe 84.

Disposed within the clutch housing 65 and equally spaced about the inner periphery thereof, as best shown in Figure 8, are a plurality of guide members 104, with one guide member located between adjacent aligned pairs of solenoids 76. Each guide member 104 comprises a generally arcuate portion 105 which is adapted to be welded or otherwise secured to the inner surface of the clutch housing 65, and a pair of leg members 106 and 107 which are inclined toward one another. The legs 106 and 107 of each guide member 104 cooperate with the leg members 106 and 107 of adjacent guide members 104 to provide parallel guide surfaces between which move the spaced leg members 86 and 87 of brake shoes 84 to thereby guide the shoes for rectilinear movement. The brake shoe leg members 86 and 87 are provided with slots 111 which accept the shanks 112 of guide pins 113 carried by leg members 106 and 107.

Figure 10 illustrates diagrammatically the equipment associated with the coupler system of Figure 3 for controlling the starting and stopping of motor 25 and thereby effect the coupling and uncoupling of propeller drive shaft 12 and engine drive shaft 21. For clarity structural details relating to the propeller, its shaft, gearing, gas turbine-engine, coupler, worm drive, etc., are omitted, and only that portion of the engine drive shaft 21 housing the electric motor 25 is shown.

As shown, the invention employs an engine tachometer 121 and a propeller tachometer 122. The engine tachometer 121 is used to determine the engine speed and the propeller tachometer 122 to indicate propeller speed. By reading these dials the pilot of an airplane utilizing the present invention determines the moment, as will be further explained hereinafter, at which he will throw either the "couple" switch 123 or the "uncouple" switch 124 to effect the actuation of the coupler elements above described to couple or uncouple the propeller drive shaft 12 and the engine drive shaft 21. The electric switches 123 and 124 are multiple contact switches of the relay type and are of conventional design. A pair of indicator lamps 130 and 131 are associated with switches 123 and 124 to indicate when these switches are in operation. Leads 125 and 126 interconnect the switches 123 and 124 with stationary contacts 119 and 120 of a motor actuating relay switch 127. Movable contacts 128 and 129 of relay switch 127 cooperate with stationary contacts 119 and 120 and are normally spring biased for engagement therewith. The motor actuating switch 127 directly controls the starting and stopping of motor 25. A coil 134 effects actuation of the movable contacts 128 and 129 of switch 127 to disengaged position. Leads 132 connect the movable contacts 128 and 129 to a double-throw limit switch 133, of conventional design, located in the circuit of motor 25. As shown one contact 135 of the limit switch 133 is in closed position and the other contact 136 is in open position. The operation of limit switch 133 is directly dependent on the motor 25. Each time that the coupler 47 is brought to couple or uncouple position by the motor 25, the limit switch 133 will be actuated to move the closed contact to open position and the opposite contact to closed position, stopping the motor 25 and preparing it for reverse operation, as will be further explained.

A conductor 137 connects the coil 134 of relay switch 127 to the propeller governing unit 14 which regulates the pitch of the propeller. When electrical power is flowing through propeller unit 14, the power being provided by synchronizing control unit 27, the coil 134 being connected to the propeller governor unit 14 through conductor 137 will be energized and the contacts of motor actuating switch 127 will be open.

A conventional selector switch 138 controls the operation of the propeller governor unit 14, being connected thereto by leads 141 and 142. This switch has three positions: "Increase," "Decrease," and "Off." With the selector switch in "off" position the propeller will operate as a fixed pitch propeller. To adjust the blade angles of the propeller, the selector switch contact blade is manually held at the "increase" or the "decrease" position dependent on whether an increase or decrease in the speed of the propeller is desired. With the desired speed attained the switch arm is moved to "off" position and the propeller will operate at the pitch determined by the previous movement. The selector switch 138 provides a means for placing control of pitch changes in the hands of the pilot.

Leads 143 interconnects the "couple" switch 123 with the selector switch 138. A lead 144 connects the "uncouple" switch 124 to lead 142 extending from switch 124 to propeller governor unit 14, and a lead 145 connects the selector switch 138 to a feathering switch 146.

The feathering switch 146 is of conventional design and comprises two switch arms 147 and 148 which are respectively actuable to "feather" and "normal" positions, the "feather" position being marked "F" and the "normal" position being marked "N" on the drawings. Movement of the switch arm 148 from "normal" position to open position removes selector switch 138 out of circuit with the propeller governor unit 14 and prevents changes in pitch of propeller 10 by switch 138. Actuation of the switch arm 147 to "feather" position will effect operation of the governor propeller unit 14 to place the propeller 10 in feathered condition.

A selector relay operated switch 153 provides means for actuating the "couple" switch 123 and "uncouple" switch 124 as will be further explained. The selector relay switch 153 is of the usual construction and comprises a pair of stationary contacts 154, a movable contact arm carrying the movable contacts 155, the movable contacts being normally held in disengaged position by a solenoid 156. Leads 157 connect the switch 153 to the solenoid coils of the "couple" switch 123 and "uncouple" switch 124.

A conventional thermal relay switch 158 is associated with the selector switch 153 to control the operation thereof. The thermal relay switch 158 comprises a stationary contact, a movable contact carried by a bimetallic element 161 which normally engages the stationary contact, and a coil 162 through which current flows to effect the flexing of the thermal element 161 to disengage the contacts. While the contacts of the thermal relay switch 158 are in engagement a circuit is completed through the solenoid 156 of selector switch 153 and its contacts will be maintained in open position. The operation of the switches 158 and 153 will be hereinafter further described. A lead 163 interconnects the thermal relay switch 158 to the motor circuit 25.

A battery 159 through appropriate leads provides power to the various switches of the system. A power boost unit 160 is associated with the battery 159. The power boost unit 160 may be of any well known construction and its function is to insure that sufficient power will be provided when fast feathering of the propeller is required. The specific construction of the power boost unit 160 forms no part of the present invention.

The engine tachometer 121 is connected by conductors 151 to the engine alternator 24 and the propeller tachometer 122 is connected by conductors 152 to the propeller alternator 18. The engine alternator 24 and the propeller alternator 18 are electrically connected to the synchronizing control unit 27 by suitable conductors. The purpose of the synchronizing control unit 27 is to effect synchronization of the speed of the propeller drive shaft 12 with that of the engine drive shaft 21 through the propeller governor unit 14 and the propeller alternator 18 and the engine alternator 24. As shown the synchronizing control unit 27 comprises a direct current reversible constant speed motor 164 which is operated from the engine alternator 24, leads 151 interconnect motor 164 with engine alternator 24. The motor 164 is mechanically interconnected with a three-phase armature or stator 165 embodied in a hysteresis motor 166 and the armature 165 will rotate at the speed of motor 164. Leads 167 connect the propeller alternator 18 to the armature 165 through slip-rings 168 whereby the propeller alternator can impress a three-phase alternating current voltage on the armature. This voltage will create a magnetic field which rotates about the armature 165 whose rotation, as has been stated, is governed by motor 164. The magnetic field will rotate only as fast as the difference between the speed of the propeller alternator 18 and that of the motor 164 (which is also the speed of the engine alternator 24). The direction of rotation is determined by the relationship between the speed of the alternator 18 and that of the motor 164, that is, the magnetic field will rotate in either direction dependent upon whether the alternator 18 is turning faster or slower than the motor 164. If both are rotating at the same speed the magnetic field will be motionless. A magnetic drag cup or rotor 171 is included in the hysteresis motor 166 and is disposed about the armature 165. The magnetic drag cup 171 is magnetizable by the rotating magnetic field and will rotate at the same speed and in the same direction as the magnetic field. The direction and speed of the drag cup 171 will determine through a contact and relay system 172 the direction and average rate of corrective electrical impulses to be transmitted to the propeller governor unit 14 from the synchronizing control unit 27, the electrical power provided the governor unit 14 will effect control of the speed of propeller 10 by effecting an adjustment of the angles of the propeller blades; this operation will be more fully described hereinafter.

The contact and relay system 172 includes a commutator 173 mechanically associated with the drag cup 171, an interrupter relay 174 and a propeller relay 175, both electrically interconnected with the commutator 173. The propeller relay 175 comprises a pair of solenoid coils 176 disposed on either side of a pivotally movable armature 177 which carries a pair of movable contacts 178, the movable contacts 178 being adapted to engage and disengage with a pair of stationary contacts 179, upon pivotal movement of the armature 177 by solenoid coils 176 when these coils are energized by current transmitted from commutator 173. A conductor 181 connects the movable contacts 178 through contact block 180 to the "couple" switch 123 and the "uncouple" switch 124. Leads 182 and 183 connect the stationary contacts 179 to the propeller governor unit 14 through contact block 180. When the left hand contact set 178—179 is closed the propeller governor unit 14 is adapted to operate to increase the speed of the propeller 10 by appropriate changes in the pitch thereof; when the right hand contact set is closed the speed of the propeller is decreased. The energization of one or the other of the solenoid coils 176 is controlled by a contact assembly 184. The contact assembly 184 comprises a pair of spaced stationary contacts 185 electrically connected to the solenoid coils 176, and a movable contact 186 mechanically actuated between these two stationary contacts by the commutator 173. The direction in which the commutator 173 is turning determines which stationary contact 185 is engaged and therefore which contact set 178—179 is closed. Dependent on which contact set 178—179 is closed, the propeller governor unit 14 will operate to increase or decrease the speed of propeller 10. The interrupter relay 174 is connected in parallel with the propeller relay coils 176. Its function is to break the ground return of the propeller relay 175 after the circuit through the relay contacts 178—179 has been momentarily established. A resistor 187 is associated with each solenoid coil 176 to maintain current in these coils for a short period of time after interrupter relay 174 opens and thereby hold the relay contacts 178—179 closed for a longer period of time to permit the governor unit 14 to operate for a long period of time to effect pitch changes in the propeller 10. When there is a difference in speed between the propeller alternator 18 and the motor 164 there will be a rotation of the magnetic field in the hysteresis motor 166 to rotate drag cup 171 and operate commutator 173 to provide corrective impulses of current to be transmitted to one or the other of the stationary contacts 185 of contact assembly 184. If the propeller alternator 18 is running slower than the motor 164 (and the engine alternator 24) current will pass to the solenoid coil 176 which closes the contact set 178—179 that causes the propeller governor unit 14 to operate to effect an increase in the speed of the propeller 10. When the speed of the propeller 10 becomes the same as the speed of the engine alternator 24 the commutator 173 will cease to feed current. If the propeller alternator 18 is running faster than motor 164, the system above described feeds corrective impulses of current to bring about a pitch change of the propeller 10 which decreases its speed, and thereby decreases the speed of its drive shaft 12.

The construction and details of the synchronizing control unit 27 above described form no part of the present invention. Any automatic device can be used which will affect the operation of the propeller governor unit 14 to cause it to function to bring about a change in the speed of the propeller 10 and its drive shaft 12 to make the speed correspond to the speed of the engine shaft 12. It is understood that the unit 27 here shown and described is merely an illustration of one means of securing the desired changes in the speed of the propeller 10, and effecting synchronism between the speeds of the propeller drive shaft 12 and the engine drive shaft 21.

The operation of the embodiment of the invention above described will now be described. Assuming the airplane utilizing this first embodiment of the invention has reached a cruising altitude and it is desired to uncouple the propeller 10 from the gas turbine engine 31 and rely only on the latter for propulsion, the pilot must, before operating "uncouple" switch 124, first provide a condition where the propeller torque and the engine torque are substantially in balance, that is the torque produced by the propeller 10 in windmilling is substantially the same as the torque produced by engine 31 in idling condition; at such a point neither is doing work on the other even though they are coupled together and rotating at the same speed because they are coupled together. The pilot obtains this point of substantial balance by throttling the speed of the engine 31 through mechanism (not shown) and actuating the propeller governor unit 14 through the selector switch 133 to effect a windmilling condition of the propeller 10. A pilot knowing his airspeed and altitude can effectively and very closely approximate this point of balance.

After the pilot has determined that the propeller and engine torques are substantially in balance the uncoupling switch 124 is actuated to complete the circuits to the motor actuating relay switch 127, the propeller governor unit 14, synchronizing control unit 27 and the selector switch 153. Since the propeller shaft 10 and the engine drive shaft 21 are operating at the same speed, no current is being fed from control unit 27 to propeller governor unit 14, and therefore solenoid coil 134 of motor actuating relay switch 127 will be deenergized and the movable contacts 128 and 129 will be in engaged position. With its contacts engaged completion of the circuit to the motor actuating relay switch 127 by uncouple switch 124 will cause the motor 25 to operate, rotating the worm drive 53 to withdraw the coupling member 47 from propeller shaft 12 and rectilinearly move it into engine drive shaft 21. As soon as the coupling member 47 has been completely withdrawn from propeller shaft 12 and it is uncoupled from the engine drive shaft 21, the limit switch 133 is adapted to be operated with contact 135 moving to disengaged position breaking the motor circuit and stopping motor 25. At the same time contact 136 moves to engaged position to prepare the motor circuit for coupling operation.

At the time the circuit to the motor actuating relay switch 127 is completed by operation of "uncouple" switch 124 current will begin to flow through the coil of thermal relay switch 158. The thermal relay switch 158 is so calibrated that as soon as the coupling motor 25 has completed its action of withdrawing the coupling element 47 from propeller shaft 12 the bimetallic member 161 will have been sufficiently heated to flex outwardly to break the circuit to solenoid coil 156 of selector switch 153 deenergizing this coil and thereby permitting the movable contacts 155 to move under spring action into engagement with stationary contacts 154. With the engagement of these contacts, the solenoid coil of "uncouple" switch 124 is energized to effect kicking out of this switch and placing it in inoperative position. The feathering switch 146 is next operated; the normal switch arm 148 is moved to open position and the feathering switch arm 147 is placed in closed position to operate the propeller governor unit 14 to effect movement of the propeller 10 to feathered position. The thermal relay switch 158 is so designed that the bimetallic element 161 does not return to unflexed position for a predetermined period of time so that the operations above described will be fully completed before solenoid coil 156 of selector switch 153 is again energized to disengage movable contacts 155 and break the circuits through selector switch 153. At this time the entire system returns to a neutral condition and is ready for the coupling operation. The propeller 10 will be disconnected from the engine drive shaft 21 and will be feathered and the airplane can then be flown on jet reaction alone. If desired solenoid coils may be associated with the normal switch arm 148 and the feathering switch arm 147 which are energizable by selector switch 153 to automatically move these switch arms to required position.

When the airplane is to be landed the propeller shaft 12 and the engine drive shaft 21 must again be coupled. To effect the coupling of these shafts the pilot will throttle the engine 31 until it is in an idling condition and will manually operate feathering switch arm 147 to disengaged position and thereby release the propeller 10 for windmilling action. He will then operate the "couple" switch 123 to effect energization of the synchronizing control unit 27. Solenoid coil 134 of motor actuating relay switch 127 will be energized by power supplied by the propeller governor unit 14 to hold the contacts of switch 127 open to prevent the operation of motor 25. If there is any discrepancy between the speed of the propeller 10 and the engine drive shaft 21 there will be a difference in the speeds of the propeller alternator 18 and the engine alternator 24 associated therewith and therefore the magnetic field of the hysteresis motor 166 will rotate to effect a rotation of the drag cup 171. Rotation of the drag cup 171 will operate through commutator 173 to feed current through contact assembly 184 and a contact set 178—179 to the propeller governor unit 14 which will operate to change the pitch of the propeller 10 and thereby change its speed. Current will continue to be fed to the governor unit 14 until the speeds of the windmilling propeller and the engine drive shaft 21 are in substantial synchronism. At this point no further current will be passed to the governor power unit 14 from control unit 27 and current will cease to flow in lead 137 to solenoid coil 134 whereby the coil will be deenergized and the movable contacts 128 and 129 of the motor actuating switch 127 will move to engaged position completing the motor circuit and causing motor 25 to operate. Motor 25 will then effect rotation of the worm drive 53 to rectilinearly move the coupling element 47 into passage 41 of propeller drive shaft 12. As described hereinbefore the ends of the exterior splines carried by the coupling element 47 and the ends 46 of splines 44 disposed in passage 41 are pointed to permit the two sets of splines to more easily and readily mesh. As soon as coupling of the shafts 12 and 21 has been effected the limit switch 133 will be actuated with contact arm 136 thereof moving to disengaged position to break the motor circuit and stop the motor 25. Arm 135 of the limit switch 133 will be moved to engaged position to prepare the motor circuit for the reverse, or uncoupling, operation of the coupler element 47.

The thermal relay switch 158 will operate, as in the uncoupling operation, to effect the deenergization of solenoid coil 156 of switch 153 to permit the movable contacts 155 thereof to move to engaged position and thereby effect energization of the solenoid coil of "couple" switch 123 to move the switch arm thereof to disengaged position cutting off the flow of power to the synchronizing control unit 27. Switch arm 148 of feathering switch is then actuated to "normal" position to render the pitch control switch 138 manually operable and permit manual control of the propeller governor unit 14.

The electrical system employed with the second embodiment of the invention is diagrammatically illustrated in Figure 11. This system differs from that of the first embodiment shown in Figure 10 primarily in the provision of means for controlling the operation of the clutch 64 utilized by the second embodiment.

As shown, this second circuit also comprises an engine tachometer 121 and a propeller tachometer 122; a "couple" switch 123a and "uncouple" switch 124a electrically connected to a motor actuating relay switch 127 which latter governs the operation of the motor 25 to effect the movement of the coupler element 47 into and out of the propeller shaft 12; the "couple" switch 123a and "uncouple" switch 124a differ from the "couple" switch 123 and "uncouple" switch 124 of the first embodiment in the provision of an additional contact set; a propeller governor unit 14 for controlling the pitch of the propeller; a pitch control switch 138 electrically associated with the propeller governor unit 14 whereby the pilot can effect operation of the governor unit to change the pitch of the propeller; a feathering switch 146 to provide for normal and feathering operations of the propeller; a selector relay switch 153a adapted to kick out the "couple" and "uncouple" switches 123 and 124 to break the circuits therethrough; selector switch 153a differs from selector switch 153 of the first embodiment in providing an additional contact set 154—155; a thermal relay switch 158 for controlling the operation of the selector relay switch 153; a battery 160 for supplying power to the various switches of the system; and a synchronizing unit 27 associated with the propeller governor unit 14 and having a propeller alternator 18 and engine alternator 24 connected thereto whereby the synchronizing unit 27 can act upon the propeller governor unit 14 to automatically bring about a change in the pitch of the propeller and change the speed of the propeller drive shaft 12 to effect a synchronization of the speed of the propeller shaft 12 and the engine drive shaft 21.

In addition to the above elements which are common to the electrical circuits of both embodiments of the present invention, Figure 11 illustrates diagrammatically the clutch housing 65 enclosing a solenoid 76. For ease of description but one of the twelve solenoids 76 and its cooperating contact set 96—101 is shown associated with the other elements of the electrical circuit. It is understood that the other solenoids 76 will be similarly connected into the circuit and will operate in like manner as the solenoid 76 is to be described.

The energy for effecting energization of the solenoid coil 98 of solenoid 76 is taken from a power bus 201 through a conductor 202. A second conductor 203 leads from solenoid coil 98 to a clutch controlling switch 204. The switch 204 includes a first contact set comprised of a stationary contact 205 and a movable contact 206 normally spring-biased into engagement with the stationary contact 205, and a second contact set comprised of a stationary contact 207 and a movable contact 208 also normally spring-biased into engagement with its cooperating stationary contact 207. A solenoid coil 211 is adapted to move the movable contact 206 to disengaged position while solenoid coil 212 will effect movement of movable contact 208 for disengagement. The solenoid coil 211 is connected by a lead 213 to propeller governor unit 14. The solenoid coil 212 is connected by a first conductor 214 to the selector relay switch 153a and by a second conductor 215 to the "couple" switch 123a and to the "uncouple" switch 124a.

Coil 134 of the motor actuating switch 127 in the circuit of Figure 11 instead of being electrically tied directly to the propeller governor unit 14 is connected by lead 216 to the contact 96 carried by the movable core member 94 of solenoid 76. The spring-biased movable contact 101 associated with contact 96 is connected by lead 217 to battery 160.

The uncoupling and coupling operations of the first embodiment of the invention has been described. The operation of the second embodiment of the invention illustrated in Figures 2, 5 through 9 and 11 to effect coupling and uncoupling of the propeller shaft 12 and the engine drive shaft 21 follows.

As in the operation of the first embodiment when the plane has reached an altitude at which it is desired to rely only on the gas turbine engine 31 for propulsion the pilot must first effect a substantial balance between the torques produced by the propeller shaft 12 and the engine drive shaft 21. This is done by placing engine 31 in an idling condition and changing the pitch of propeller 10 through the selector switch 138 and propeller governor unit 14. At such time as the pilot determines that the torques are in substantial balance the "uncouple" switch 124a is operated to connect the synchronizing control unit 27 and the motor actuating switch 127 in circuit. Since the propeller drive shaft 12 and engine drive shaft 21, being coupled, are turning at the same speed there will be no current flowing through the propeller relay switch 175 of synchronizing control unit 27 and therefore there will be no current being provided to the propeller governor unit 14 from the synchronizing control unit 27. Therefore no current will pass from the propeller governor unit 14 to the solenoid coil 211 of the clutch controlling switch 204 and it will be deenergized whereupon contacts 205 and 206 will engage closing the circuit through the solenoid coil 98 of clutch solenoid 76 and permitting power to be supplied thereto from the power bus 201 to move core member 94 to its outer position and hold it in this position. All of the clutch solenoids 76 will operate in like manner. With the clutch solenoids 76 energized the brake shoes 84 connected to the core members 94 will be moved to seated position in the indentations 83 in bearing sleeve 82 which is carried upon the exterior of the engine drive shaft 21. With the brake shoes 84 in their seated position and the core members 94 which actuate the brake shoes 84 in their outermost position each of the contacts 96 carried by the core members 94 will be disengaged from its associated contact 101 and the circuit to solenoid coil 134 of the motor actuating switch 127 will be broken so that the coil 134 will be deenergized and the movable contacts 128 and 129 of switch 127 will be placed by spring action in circuit making position and power can be fed from the battery 160 through "uncouple" switch 124a to the windings of motor 25. Motor 25 will operate to effect rotation of the worm drive 57 to rectilinearly move coupler element 47 and withdraw it from passage 41 of propeller drive shaft 12. As soon as the coupler member 47 is completely withdrawn from the propeller drive shaft 12 the limit switch 133 is adapted to be operated to break the motor circuit and stop the motor 25. Contact arm 135 will move to open position and contact arm 136 will move to closed position preparing the motor 25 for its next operation in the reverse direction for reverse movement of coupler member 47.

Simultaneously with the stopping of the motor 25 the thermal relay switch 158 will operate for its bimetallic member 163 will have been heated a sufficient amount to flex and break the circuit through solenoid coil 156 of selector switch 153a deenergizing the coil and permitting the movable contacts 155 to move to circuit making position. Movement of movable contacts 155 to contacts engaged position will effect energization of solenoid coil 212 of clutch controlling switch 204 to disengage movable contact 208 from its cooperating stationary contact 207 breaking the circuit to solenoid coils 98 of clutch solenoids 76 allowing core elements 94 to move inwardly into their casings 78 and permit the brake shoes 84 connected to core elements 94 to move out of indentations 83 in bearing sleeve 82 and thereby out of braking position. Simultaneously the engagement of the contacts of selector switch 153a will effect energization of the solenoid coil of "uncouple" switch 124a to cause this switch to kick out and place the coupling system in neutral. The feathering switch 146 is then actuated to place switch arm 147 in "feather" position and the propeller governor unit 14 will effect feathering of the propeller 10. The normal switch arm 148 will be open. The airplane can then be propelled entirely by the engine 31.

At such time as it is desired to re-couple the propeller drive shaft 12 and the engine drive shaft 21 as when coming in for a landing the pilot will first throttle the engine 31 to idling speed and will move the "feather" switch arm 147 to disengaged position whereby the propeller 10 will be given a windmilling action. The "couple" switch 123a will next be operated to feed power to the synchronizing control unit 27. If the drive shaft 12 of the windmilling propeller 10 and the engine drive shaft 21 are not rotating at the same speed the propeller alternator 18 and the engine alternator 24 will cooperate as in the coupling operation of the first embodiment of the invention described above to bring about synchronization of the speeds of the two shafts through the synchronizing control unit 27. With any discrepancy between the speeds of shaft 12 and 21 a rotation of the magnetic field of hysteresis motor 166 will be effected which will cause the magnetic drag-cup 171 to rotate. Rotation of drag cup 171 will operate through commutator 173 to feed impulses of current to the propeller control relay switch 175, as hereinbefore described, and through the contact set 184, solenoids 176 and contact sets 178—179 pass corrective current to the propeller governor unit 14 to cause the latter to effect a change in the pitch setting of the propeller 10 and thereby a change in its speed and the speed of its shaft 12. As synchronism between the speeds of propeller drive shaft 12 and engine drive shaft 21 is obtained current will cease to flow from the synchronizing control unit 27 to the propeller governor unit 14. With no current flowing in the propeller governor unit 14 the solenoid coil 211 of clutch controlling switch 204 will be deenergized permitting movable contact 208 to engage stationary contact 207 completing the circuit to solenoid coil 98 of clutch solenoid 76 and thereby effect movement of the core element 94 outward from its casing 78. All the core elements 94 of the twelve solenoids 76 are actuated simultaneously; as has hereinbefore been stated, only one solenoid 76 has been shown for ease of description but the manner of operation of this one solenoid is characteristic of all. With the core elements 94 moving outwardly from their casings 78 the brake shoes 84 connected to the core elements 94 will be carried toward the braking surface 82 provided upon the exterior of engine drive shaft 21. These brake shoes 84 will engage the brake sleeve 82 and move into a seat in the shallow indentations 83 provided by the bearing sleeve 82. With the seating of brake shoes 84 in indentations 83 contact 96 carried by core element 94 disengages from its associated contact 101 to break the circuit to solenoid coil 134 of motor actuating switch 127, deenergizing coil 134 and permitting movable contacts 128 and 129 to move under spring bias to engaged position whereby power can be supplied to the windings of motor 25 through "couple" switch 123a to operate said motor to rotate the worm drive 53. It is noted that the contacts 96 and 101 associated with the movable core elements 94 do not disengage until the brake shoes 84 are actually seated within an indentation 83. The springarm carried contact 101 maintains engagement with contact 96 until brake shoe 84 moves to its seat, at which time a stop 102 engages contact 101 and disengagement is effected. In this manner, the coupling motor 25 can never be started until the brake shoes 84 are properly positioned. Rotation of worm drive 53 by motor 25 rectilinearly moves the coupler element 47 into passage 41 of propeller drive shaft 12. With the brake shoes 84 seated in indentations 83 the engine drive shaft 21 and the propeller drive shaft 12 will be driven at exactly the same speed and no variations in speed can occur. The splines 45 of engine drive shaft 21 will be in exact alignment with the splines 44 of propeller drive shaft 12 so that when the coupling motor 25 operates to effect movement of the coupler element 47 into the propeller drive shaft 12 there will be a smooth and unobstructed movement out of the engine drive shaft 21 and onto splines 44 to effect the coupling of the two shafts 12 and 21 together. Thus there will be a first coupling of the engine drive shaft 21 and propeller drive shaft 12 through the clutch means 64 to insure proper alignment of splines 44 and 45 and then a final coupling through the coupler element 47 whereby power can then be effectively transmitted from the engine drive shaft 21 to propeller drive shaft 12.

After the coupling motor 25 has moved the coupler element 47 into coupling position limit switch 133 is operated to break the motor circuit, as has hereinbefore been described, to stop the operation of motor 25 and prepare it for reverse movement.

Also upon completion of the coupling action the thermal relay switch 158 will operate through flexing of its bimetallic member 161 to deenergize solenoid coil 156 of selector switch 153a to permit its contacts 154—155 to engage. Engagement of these contacts 154—155 will energize the solenoid coil of "couple" switch 123a to cause it to throw said switch to circuit breaking position, to deenergize the synchronizing control unit 27 and place the coupling system at rest.

The switch arm 148 of the feathering switch 146 is actuated to "normal" position to again connect the pitch control switch 138 into circuit with the propeller governor unit 14 and thereby permit changes in propeller pitch to be made through the switch 138.

While certain preferred embodiments of the invention have been specifically disclosed, it is understood that the invention is not limited thereto as many variations will be readily apparent to those skilled in the art and the invention is to be given its broadest possible interpretation within the terms of the following claims.

Having thus described the invention what I claim as new and desire to secure by Letters Patent is:

1. Means for coupling and uncoupling a rotatable propeller drive shaft having a bore therein and a gas turbine drive shaft coaxially aligned therewith and also having a bore therein comprising means for effecting substantial synchronization between the speeds of rotation of said propeller drive shaft and the speed of rotation of said gas turbine engine drive shaft, and coupler means adapted to move within the bores of said drive shafts when they are rotating in substantial synchronism to effect coupling and uncoupling of said drive shafts.

2. Means for releasably coupling a hollow propeller shaft and a coaxially aligned hollow gas turbine engine drive shaft comprising means for effecting substantial synchronization between the speed of rotation of said propeller drive shaft and the speed of rotation of said gas turbine engine drive shaft, a reversibly movable coupler means movable within said drive shafts to effect coupling and uncoupling of said drive shafts, and motor means operatively connected to said coupler means for effecting reverse movement of said coupler means between operative and inoperative positions.

3. Means for releasably coupling for common movement a propeller drive shaft having a bore therein and a coaxially aligned gas turbine engine drive shaft also having a bore therein comprising a plurality of annularly spaced longitudinal ribs disposed in said propeller drive shaft bore, a plurality of annularly spaced longitudinal ribs disposed in said engine drive shaft bore, means for effecting substantial synchronization between the speed of rotation of said propeller drive shaft and the speed of rotation of said gas turbine engine drive shaft, a movable coupler means rectilinearly movable within the bores of said drive shafts and upon said ribs to effect coupling and uncoupling of said drive shafts, motor means, a rotatable means interconnecting said motor means and said rectilinearly movable coupler means whereby said motor means can effect reverse movement of said coupler means between operative and inoperative positions.

4. Means for releasably coupling for common movement a propeller drive shaft having a bore therein and a coaxially aligned gas turbine engine drive shaft also having a bore therein comprising a plurality of annularly spaced longitudinal ribs disposed in said propeller drive shaft bore, a plurality of annularly spaced longitudinal ribs disposed in said engine drive shaft bore, means for effecting substantial synchronization between the speed of rotation of said propeller drive shaft and the speed of rotation of said gas turbine engine drive shaft, a movable coupler means disposed for movement within said bores and having peripheral longitudinal ribs provided thereon, said latter ribs cooperating with said ribs in the bores of said drive shafts to couple said drive shafts for common movement, and motor means having an operative connection with said coupler means and adapted to rectilinearly move said coupler means in reverse directions between operative and inoperative positions.

5. Means for releasably coupling for common movement a propeller drive shaft and a coaxially aligned gas turbine engine drive shaft comprising means for effecting substantial synchronization between the speed of rotation of said propeller drive shaft and the speed of rotation of said gas turbine engine drive shaft, a first coupling means controlled by said synchronizing means and operative after said propeller drive shaft and said gas turbine engine drive shaft are rotating in substantial synchronization for connecting said drive shafts together, and a second coupling means operative, after said first coupling means has effected connection of said drive shafts, to move to coupling position to connect said drive shafts.

6. Means for releasably coupling for common movement a propeller drive shaft having a bore therein and a coaxially aligned gas turbine engine drive shaft also having a bore therein comprising means for effecting substantial synchronization between the speed of rotation of said propeller drive shaft and the speed of rotation of said gas turbine engine drive shaft, a first coupling means carried upon the exterior of one of said drive shafts, operative after said propeller drive shaft and said gas turbine engine drive shaft are rotating in substantial synchronization, for connecting said drive shafts together, a second coupling means movable within said drive shafts and adapted to move to coupling position after said first coupling means has effected connection of said drive shafts, and motor means for moving said second coupling means in reverse directions between its operative and inoperative positions.

7. Means for releasably coupling for common movement a propeller drive shaft and a coaxially aligned gas turbine engine drive shaft comprising means for effecting substantial synchronization between the speed of rotation of said propeller drive shaft and the speed of rotation of said gas turbine motor drive shaft, a first coupling means, controlled by said synchronizing means, for connecting said drive shafts together and adapted to operate when substantial synchronization between the speeds of rotation of said drive shafts has been effected, a second coupling means adapted to move to coupling position after said first coupling means has effected connection of said drive shafts, and motor means for moving said second coupling means in reverse directions between its operative and inoperative positions.

8. Means for coupling and uncoupling a propeller drive shaft having a bore therein and a gas turbine drive shaft coaxially aligned therewith and also having a bore therein comprising means for effecting substantial synchronization between the speeds of rotation of said propeller drive shaft and the speed of rotation of said gas turbine motor drive shaft, a first coupling means carried upon the exterior of one of said drive shafts for effecting a connection between said drive shafts and adapted to move to coupling position when substantial synchronization between the speeds of rotation of said drive shafts has been effected, a second coupling means movable within said drive shafts and adapted to move to coupling position after said first coupling means, and motor means for moving said second coupling means in reverse directions between operative and inoperative positions.

9. Means for releasably coupling a hollow rotatable propeller drive shaft and a coaxially aligned gas turbine engine hollow rotatable drive shaft comprising a plurality of longitudinal splines disposed in said propeller drive shaft and in said engine drive shaft, means for effecting substantial synchronization between the speed of rotation of said propeller drive shaft and the speed of rotation of said gas turbine engine drive shaft, means for effecting alignment of said splines provided in said drive shafts and coupler means engageable with said splines for connecting said drive shafts together for common movement and operable when said drive shafts are rotating in substantial synchronism to move to coupling position, and motor means having an operative connection with said coupler means and adapted to move said coupler means in reverse directions between operative and inoperative positions.

10. Means for releasably coupling a propeller drive shaft and a coaxially aligned gas turbine engine drive shaft comprising means for effecting substantial synchronization between the speed of rotation of said propeller drive shaft and the speed of rotation of said gas turbine engine drive shaft, coupler means operable to couple and uncouple said drive shafts when they are rotating in substantial synchronism, a motor operatively connected to said coupler means for moving it between operative and inoperative positions, control means for said motor for preventing operation thereof until said shafts are rotating in substantial synchronism, and means connecting said control means with said synchronization means.

11. Means for releasably coupling a propeller drive shaft and a coaxially aligned gas turbine engine drive shaft comprising means for effecting substantial synchronization between the speed of rotation of said propeller drive shaft and the speed of rotation of said gas turbine engine drive shaft, reversibly movable coupler means operable to couple and uncouple said drive shafts when they are rotating in substantial synchronism, a motor operatively connected to said coupler means for effecting reverse movement of said coupler means between operative and inoperative positions, electric control means for said motor for preventing operation thereof until said shafts are rotating in substantial synchronism, and means electrically connecting said electric control means with said synchronization means.

12. Means for releasably connecting for common action a propeller drive shaft and a coaxially aligned gas turbine engine drive shaft comprising means for effecting substantial synchronization between the speed of rotation of said propeller drive shaft and the speed of rotation of said gas turbine engine drive shaft, coupler means operable to couple and uncouple said drive shaft when they are rotating in substantial synchronism, a motor operatively connected to said coupler means for moving it between operative and inoperative positions, a relay switch electrically connected to said motor for controlling the flow of current thereto having contact means adapted to be positioned in circuit-breaking position until said drive shafts are rotating in substantial synchronism, and means electrically connecting said relay switch with said synchronization means for controlling the movement of said relay switch contact between circuit-making and circuit-breaking positions.

OTTO WILLIAM EHLERS.

REFERENCES CITED

The following references are of record in the file of this patent:

UNITED STATES PATENTS

| Number | Name | Date |
|---|---|---|
| 1,624,008 | Ricker | Apr. 12, 1927 |
| 1,680,209 | Emmet | Aug. 7, 1928 |
| 1,914,566 | Haseltine | June 20, 1933 |
| 2,017,997 | Thomas | Oct. 22, 1933 |
| 2,080,484 | Hunt | May 18, 1937 |
| 2,110,675 | Pike | Mar. 8, 1938 |
| 2,163,514 | Farren | June 20, 1939 |
| 2,253,578 | Peterson et al. | Aug. 26, 1947 |
| 2,423,183 | Forsyth | July 1, 1947 |
| 2,426,008 | Forsyth | Aug. 19, 1947 |
| 2,427,846 | Forsyth | Sept. 23, 1947 |
| 2,465,538 | Jensen | Mar. 29, 1949 |

FOREIGN PATENTS

| Number | Country | Date |
|---|---|---|
| 495,469 | Great Britain | Feb. 8, 1937 |
| 851,130 | France | Sept. 25, 1939 |